CARRIER OPERATED RELAY CIRCUIT

Filed Nov. 4, 1955

INVENTOR.
ROBERT M. SPIEGEL
BY Edward M. Farrell
ATTORNEY

United States Patent Office 2,906,867

Patented Sept. 29, 1959

2,906,867

CARRIER OPERATED RELAY CIRCUIT

Robert M. Spiegel, Philadelphia, Pa., assignor to Tele-Dynamics Inc., a corporation of Pennsylvania Application November 4, 1955, Serial No. 545,075

6 Claims. (Cl. 250—20)

Figures 1, 2:
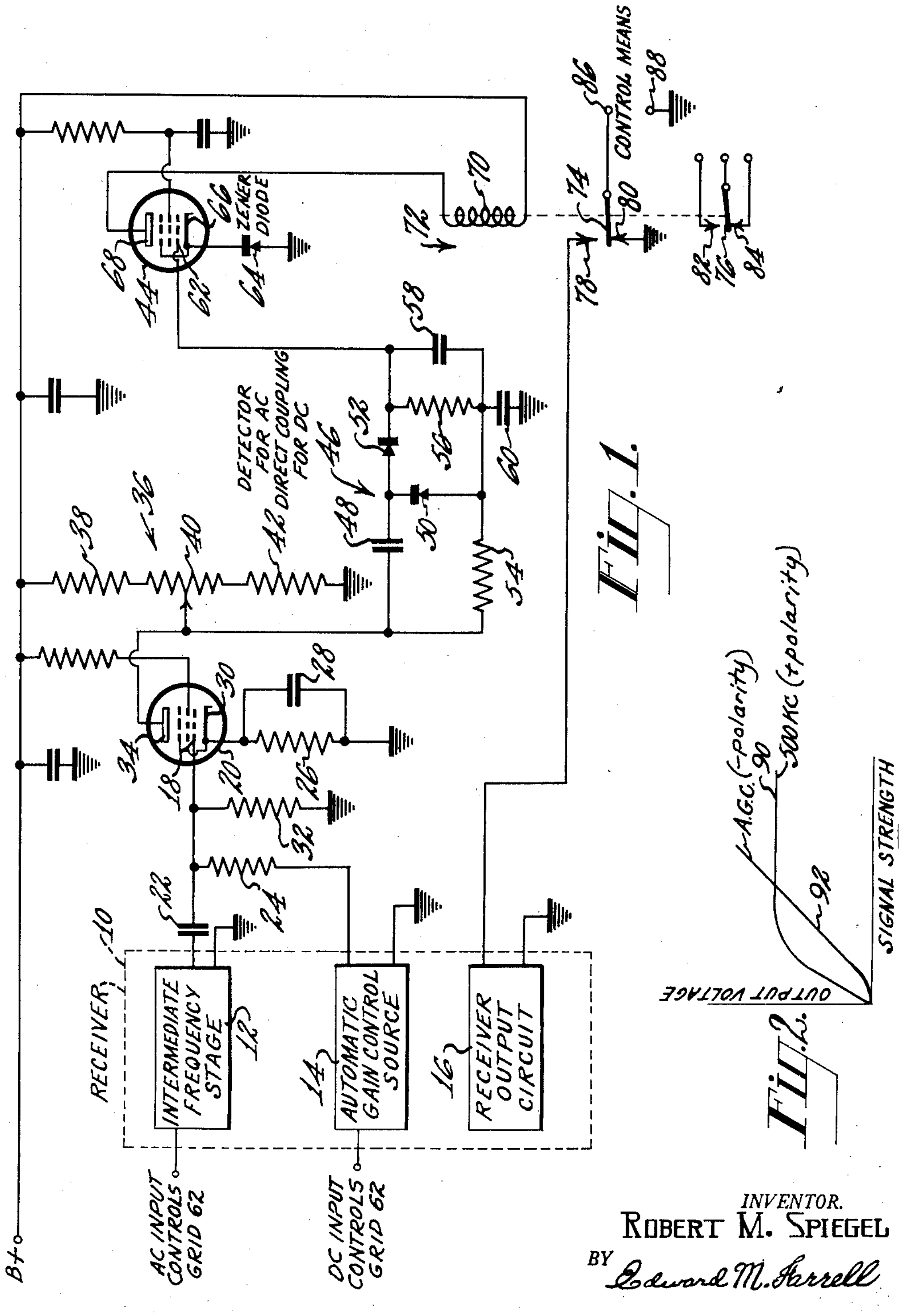

This invention relates to receivers, and more particularly to carrier operated relay circuits associated with such receivers.

In the development of guided missiles and pilotless aircraft, guidance receivers are often used to receive signals which actuate automatic devices which in turn control various functions associated with a guided missile or aircraft. Such automatic devices generally include relays which become operative when carrier signals of predetermined amplitudes are applied to the receiver.

In the absence of a carrier signal or when the strength of the carrier signal is low, the output noise from a guidance receiver may be relatively high and may, in many cases, cause spurious responses within a system. Such spurious responses may effect the operation of a guided missile or pilotless aircraft in an undesired manner. Various interfering signals may also effect carrier operated relays to cause spurious operation of certain functions within the missile or aircraft.

In guidance receiver systems utilizing a carrier operated relay, the amplitude of an incoming carrier signal must generally be of a predetermined value, as determined by a setting of a threshold control, to cause operation of the relay. If the threshold level is set too low as to be actuated by a relatively weak carrier signal, noise and other interfering signals may effect an unwanted operation of the relay. On the other hand, if the threshold level is set too high so as to be actuated only by a relatively strong carrier signal, incoming carrier signals below the threshold level will not actuate the carrier operated relay.

It is seen that the carrier signal strength, as well as the strength of noise and interfering signals, may be different at different times. Since the signal to noise ratio will vary from time to time, it is necessary for an operator to adjust the threshold level from time to time dependent upon the environment in which a missile or aircraft is operating.

Heretofore, operation of a carrier operated relay was generally dependent upon the strength of an A.V.C. (Automatic Volume Control) or A.G.C (Automatic Gain Control) voltage within the guidance receiver. This voltage was generally obtained in a conventional manner.

It is known that in many receivers an automatic gain control voltage is utilized to control the gain of I.F. or R.F. stages. For very low level incoming signals, little or no automatic gain control voltage is produced. However, when the incoming carrier signal exceeds a certain value, the automatic gain control voltage produced increases substantially in accordance with the strength of the incoming carrier signal. In some cases, it may be desirable to set the threshold level so that the carrier level relay operates when signals only slightly greater than the random noise of the receiver are received. These signals may be smaller than those required to generate an A.G.C. voltage.

It is an object of this invention to provide an improved carrier operated relay circuit.

It is a further object of this invention to provide an improved carrier operated relay circuit, in which a setting of the threshold level will provide different control voltages for carrier signals of widely varying levels.

It is still a further object of this invention to provide an improved carrier operated relay circuit employing novel biasing means for an electron discharge device.

In accordance with the present invention, a carrier operated relay actuates contact means to connect a receiver output circuit to a control means or utilization circuit. An automatic gain control voltage and an intermediate frequency signal voltage within the receiver are both combined to drive an electron discharge device which controls the operation of the carrier operated relay. Adjustable means are provided to vary the threshold level at which the carrier operated relay operates.

Other objects and advantages of the present invention will be apparent and suggest themselves to those skilled in art to which the invention is related, from a reading of the following specification in connection with the accompanying drawing, in which:

Figure 1 is a schematic representation, partly in block diagram form, of a carrier operated relay circuit, in accordance with the present invention, and Figure 2 is a pair of curves representing the output voltage relationship for carrier signal of different levels between an automatic gain control voltage and an intermediate frequency signal voltage of a receiver.

Referring particularly to Figure 1, a receiver is illustrated by a dotted box 10. An intermediate frequency stage of a conventional type well known to those skilled in the art within the receiver is represented by a block 12. A source of automatic gain control voltage, which may be from circuits associated with diode devices found in most conventional receivers, is represented by a block 14 and a receiver output circuit, which may be connected to control circuitry exterior to the receiver, is represented by a block 16.

The output voltage from the intermediate frequency stage 12 is applied to the control grid 18 of an electron discharge device 20 through a coupling capacitor 22. The output voltage from a source of the automatic gain control voltage 14 is also applied to the control grid 18 through a resistor 24. Self biasing means for the electron discharge device 20 are provided by a resistor 26 and a capacitor 28 connected between the cathode 30 and a point of reference potential designated as ground. A grid leak resistor 32 is connected between the grid 18 and ground. The anode 34 is connected to a source of operating potential, designated as B+, through a resistor network 36 comprising a resistor 38, a variable resistor 40, and a resistor 42 connected between B+ and ground.

The output voltage from the anode 34 is coupled to a second electron discharge device 44 through a coupling network 46. The coupling network 46 includes a form of voltage doubler comprising a capacitor 48, a pair of diodes 50 and 52, resistors 54 and 56, a capacitor 58 and a capacitor 60. The voltage at the diodes 50 and 52 will be close to the voltage at the anode 34 and is dependent to a great extent upon the setting of the variable resistor 40, as well as the signals applied to the control grid 18.

The output voltage from the coupling network 46 is applied to the control grid 62 of the electron discharge device 44. Self biasing means for the device 44 are provided by a diode 64 connected between the cathode 66 and ground. The anode 68 is connected to B+ through a coil 70 of a carrier operated relay 72. The carrier operated relay 72 includes a pair of movable contact arms 74 and 76. The movable contact arm 74 is adapted to close one of the contacts 78 or 80. The movable contact arm 76 is adapted to close one of the contacts 82 or 84. The receiver output circuit 16 is adapted to be connected to a pair of output terminals 86 and 88 when the movable contact 74 engages the contact 78.

In considering the operation of this circuit, the carrier operated relay 72 is maintained inoperative in the absence of a carrier or when the carrier signal is weaker than that necessary to overcome the threshold level to operate the relay. The electron discharge device 44 is biased by the diode 64 so that a small current ordinarily flows through a coil 70. Under these conditions, the movable contact arm 74 is grounded through the contact 80 and no receiver output voltage is applied to the terminals 86 and 88. Also, the movable contact arm 76 engages contact 84. Thus no noise is applied to the terminals 86 and 88 in the absence of a carrier signal, minimizing the possibility of spurious operation of certain functions within an associated missile or aircraft.

When a positive signal is applied to the control grid 62, the current through the coil 70 increases. When the current through the coil 70 increases to a predetermined value, the movable contact arms 74 and 76 engage contacts 78 and 82, respectively. It is seen that the receiver output circuit 16 is connected to the output terminals 86 and 88 when the relay 72 becomes operative by a current through the winding 70. The terminals 86 and 88 may be connected to control various functions within a missile or aircraft. Likewise the position of the movable contact arm 76 may be connected to control certain programming operations or other functions within a system involving a missile or aircraft.

In the present invention, the carrier operated relay 72 may be made operative by an automatic gain control voltage, by the voltage from an intermediate frequency stage or by a combination of the two voltages. The use of two sources of voltage to control the operation of the carrier operated relay 72 may be seen by referring to Figure 2. As the incoming carrier to a receiver varies, the output voltages from an intermediate frequency stage and a source of automatic gain control voltage generally assume certain characteristics.

A curve 90 represents the strength of the intermediate frequency signal, or may represent any voltage having a characteristic similar to an intermediate frequency voltage. When the incoming carrier signal voltage reaches a certain level, the voltage from the intermediate frequency stage or other source is sufficient to drive a limiter stage of a receiver that its voltage does not vary. Below this certain level, the output voltage associated with the intermediate frequency stage may be proportional to the strength of the carrier signal strength, as indicated. In some cases, the amplitude of the voltage from an intermediate frequency stage may be limited by the application of a gain control voltage thereto rather than by a limiter stage. Regardless of how the saturated level of the intermediate frequency signal voltage is obtained, any variations in the carrier signal strength beyond that level will not effect the operation of the carrier operated relay 72.

On the other hand, it is seen that an automatic gain control voltage within a receiver, represented by a curve 92, generally varies according to the strength of an incoming signal and does not reach a saturation or limited level. The variation of the automatic gain control voltage generally will not apply for very weak signals when little or no automatic gain control voltage is produced. Other sources of voltages may exhibit properties similar to the automatic gain control voltage source and may, if desired, be used in the place thereof.

If an intermediate frequency voltage, having an amplitude represented by the curve 90, is used alone to actuate a carrier operated relay, all incoming signals exceeding a certain amplitude will effect the operation of the relay in substantially the same manner. In many cases, it is desirable that the carrier relay remain inoperative for incoming signals of relatively high values. This is true when the noise level or interfering signals are relatively high in amplitude. Consequently, the use of the intermediate frequency signal voltage alone is not satisfactory in all circumstances where it is desirable to adjust the threshold level or operating point of a carrier operated relay so that operation is attained only when very strong carrier signals are applied to the receiver. It is noted, however, that in some cases, use of the intermediate frequency signal voltage alone may be used to operate the carrier operated relay. Also, a signal which does not reach the saturation or limiting point may be used. However, the convenient form of voltage generally available in many receivers has a characteristic illustrated by the curve 90.

If it is desirable to adjust the threshold level of the carrier operated relay for operation when the incoming carrier signal is relatively weak, it is seen that the use of an intermediate frequency signal voltage alone, as represented by the curve 90, will provide satisfactory operation. However, since many guidance receivers operate in widely varying environmental conditions, versatility of the receiver for maximum use with varying noise and signal level is highly desirable.

To provide versatility of operation for guidance receiver systems, the present invention provides means for controlling the operation of a carrier operated relay by an automatic gain control voltage, the amplitude of which varies in proportion to the strength of the incoming carrier signal, as represented by the curve 92. If the automatic gain control voltage and the intermediate frequency voltage are both used to control the operation of the carrier operated relay, the threshold level to operate the carrier operated relay may be adjusted for both relatively strong and weak carrier signals. For weak signals below a certain level, the intermediate frequency signal voltage will have the greater effect upon the operation of the carrier operated relay. For strong signals above a certain level, the automatic gain control voltage will have greater effect upon the operation of the carrier operated relay. When the combined voltage resulting from the automatic gain control voltage source and the intermediate frequency stage is used to control the operation of the carrier operated relay 72, the threshold level control may be varied to provide satisfactory operation for carrier signals of widely varying amplitudes. Generally, any two sources of voltage, one variable for weak signals and the other variable for strong signals may be used in carrying out the present invention.

The output voltages from the intermediate frequency stage 12 and the automatic gain control source 14 are both applied to the control grid 18 and amplified by the electron discharge device 20. The device 20 acts as a single amplifier for both D.C. and A.C. signals with the applied signals effecting its operation in the same sense. The output voltage from the anode 34 is applied to the form of voltage doubler network 46. The amplitude of the voltage applied to the network 46 is dependent upon the setting of the variable resistor 40. The variable resistor 40 may be considered as the threshold level control. The level of the carrier signal necessary to operate the relay 72 will be dependent upon the position of the arm on the variable resistor 40.

The automatic gain control voltage is first applied to device 20 across the resistors 24 and 32 which form a voltage divider to limit the voltage which is applied to the control grid 18. This voltage divider is sometimes necessary since the amplitude of the A.G.C. voltage may be high enough to operate the carrier relay nullifying the effect of the intermediate frequency voltage upon the relay. The A.G.C. voltage, after amplification, is applied to the control grid 62 through the resistors 54 and 56. A negative voltage applied to the control grid 18 will cause the voltage at the anode 34, and consequently at the control grid 62, to become more positive causing the current in the device 44 to increase.

When the amplified alternating intermediate frequency signal is applied to the network 46, it is rectified and doubled. During the negative half of the alternating signal, the diode 50 is conductive causing electrons to flow away from the right side of the capacitor 48 thereby making it positive. The diode 52 is substantially nonconductive during the negative half-cycle. During the positive half cycle, the positive signal, as well as the charge accumulated on the capacitor 48, causes the diode 52 to conduct producing a voltage drop across the resistor 56 and a positive voltage at the control grid 62. A charge substantially double in amplitude to the peak applied is accumulated by the capacitor 58. It is seen that the network 46 may be considered as a half wave voltage doubler. The positive voltage resulting from the intermediate frequency signal causes the current in the device 44 to increase. The intermediate frequency signal voltage and the automatic gain control voltage are both effective to control the current flow in the device 44.

When the current through the device 44 reaches a predetermined value, the current through the coil 70 causes the movable contacts arms 74 and 76 to close the contacts 78 and 82, respectively. Closing of the contacts may be used to operate various circuits or to actuate devices for controlling various functions in a missile or receiver.

A feature of the present invention resides in the novel means for biasing the electron discharge device 44. The diode 64 is of a semi-conductor type and has a characteristic which provides a relatively constant large voltage drop thereacross when a large or a small current flows therethrough. A relatively constant high negative bias for the device 44 is therefore attained without providing additional circuitry.

While a preferred form of the invention has been described in connection with voltages from an automatic gain control voltage source and a source associated with an intermediate frequency stage, the invention may be practiced utilizing other sources of voltage. For example, any voltage varying in accordance with the strength of an incoming carrier signal may be used in the place of the automatic gain control voltage. Also, a voltage which varies in accordance with the strength of the incoming signal for relatively weak signals and is relatively fixed for strong carrier signals may be employed in the place of the intermediate frequency signal voltage. Also, in some cases, a single signal voltage which varies in accordance with the strength of both strong and weak incoming signals may be employed in place of the A.G.C. and the intermediate frequency signal voltages.

Although the present invention has been illustrated through the use of vacuum tubes of the pentode type, it is obvious that the amplifier devices shown may be of various other types including transistors.

I claim:

1. In combination with a receiver and a carrier operated relay to actuate contact means for connecting an output circuit of said receiver to a control means, an electron discharge device having its space current path serially connected with said carrier operated relay, an amplifier device, an automatic gain control circuit included in said receiver, means for applying a variable gain control voltage from said automatic gain control circuit to said amplifier device, an intermediate frequency stage included in said receiver, means for applying a variable intermediate frequency signal voltage from said intermediate frequency stage to said amplifier device, the output voltage from said amplifier device being determined by said automatic gain control voltage and said intermediate signal voltage, means for applying the amplified automatic gain control voltage to said electron discharge device, a rectifier, means for applying the amplified intermediate frequency signal voltage to said rectifier, means for applying the output voltage from said rectifier to said electron discharge device to control the current therethrough, and means for biasing said electron discharge device.

2. In a receiver having an automatic gain control circuit, an intermediate frequency stage and an output circuit, the combination comprising contact means, a carrier operated relay to actuate said contact means to connect said output circuit to a control means, an electron discharge device having its space current path serially connected with said carrier operated relay, an amplifier device, means for applying a variable automatic gain control voltage from said automatic gain control circuit to said amplifier device, means for applying a variable intermediate frequency signal voltage from said intermediate frequency stage to said amplifier device, the output voltage from said amplifier device being determined by said automatic gain control voltage and said intermediate signal voltage, a voltage doubler circuit, means for applying the output voltage representing said variable automatic gain control voltage from said amplifier device to said electron discharge device, means for applying the output voltage representing said intermediate frequency signal voltage to said voltage doubler circuit, means for applying the output voltage from said voltage doubler circuit to said electron discharge device, and means for biasing said electron discharge device.

3. The combination as set forth in claim 2 wherein means are provided to control the amplitude of the voltage applied from said amplifier device to said voltage doubler circuit.

4. In combination with a carrier operated relay, a receiver including an automatic gain control circuit, an intermediate frequency stage and an output circuit, a ground return point, contact means for connecting a receiver output circuit to a control means when a carrier signal of a predetermined amplitude is applied to said receiver and for returning said control means to said ground return point when the carrier signal is below a predetermined amplitude, an electron discharge device having its space current path serially connected with said carrier operated relay, an amplifier device, means for applying an automatic gain control voltage from said automatic gain control circuit to said amplifier device, means for applying an intermediate frequency signal voltage from said intermediate frequency stage to said amplifier device, the output voltage from said amplifier device being determined by said automatic gain control voltage and said intermediate signal voltage, having an intermediate frequency stage, an automatic gain control circuit and an output circuit, a voltage doubler circuit, variable control means for applying said output voltage from said amplifier device to said voltage doubler circuit, means for applying the output voltage from said voltage doubler circuit to said electron discharge device to control the current therethrough, and semi-conductor diode means for biasing said electron discharge device connnected in the space current path thereof.

5. In combination with a carrier operated relay associated with a receiver having an intermediate frequency stage, an automatic gain control circuit and an output circuit, contact means adapted to be actuated by said carrier operated relay for connecting said receiver output circuit to a control means when a carrier signal of a predetermined amplitude is applied to said receiver, said contact means further being adapted to return said control means to ground when the carrier signal is below a predetermined amplitude, an electron discharge device having its space current path serially connected with said carrier operated relay, said electron discharge device including an anode, a cathode and a control grid, an amplifier device, means for applying an automatic gain control voltage from said automatic gain control circuit to said amplifier device, means for applying an intermediate frequency signal voltage from said intermediate frequency stage to said amplifier device, the output voltage from said amplifier device being determined by said automatic gain control voltage and said intermediate signal voltage, a voltage doubler circuit, a variable resistor for applying said output voltage from said amplifier device to said voltage doubler circuit, means for applying the output voltage from said voltage doubler circuit to the control grid of said electron discharge device to control the current therethrough, and a semi-conductor diode for biasing said electron discharge device directly connected between the cathode of said electron discharge device and ground.

6. In combination with a receiver and a carrier operated relay to actuate contact means for connecting an output circuit of said receiver to a control means, an electron discharge device having its space current path serially connected with said carrier operated relay, an amplifier device, an automatic gain control circuit included in said receiver, means for applying a variable automatic gain control voltage from said automatic gain control circuit to said amplifier device, an intermediate frequency stage included in said receiver, means for applying a variable intermediate frequency signal voltage from said intermediate frequency stage to said amplifier device, the output voltage from said amplifier device being determined by said automatic gain control voltage and said intermediate signal voltage, means for applying the output voltage from said amplifier device to said electron discharge device to control the current therethrough, and means for biasing said electron discharge device including a semi-conductor diode device connected in space current path of said electron discharge device, said semi-conductor diode being normally conducting during the operation of said electron discharge device.

References Cited in the file of this patent

UNITED STATES PATENTS

| | | |
|---|---|---|
| 2,023,458 | Yolles | Dec. 10, 1935 |
| 2,115,813 | Jarvis | May 3, 1938 |
| 2,282,092 | Roberts | May 5, 1942 |
| 2,400,948 | Peterson | May 28, 1946 |
| 2,447,564 | Carnahan | Aug. 24, 1948 |
| 2,589,711 | Lacy | Mar. 18, 1952 |
| 2,751,493 | Hargrove | June 19, 1956 |
| 2,859,338 | Paluka | Nov. 4, 1958 |

UNITED STATES PATENT OFFICE

CERTIFICATE OF CORRECTION

Patent No. 2,906,867 September 29, 1959

Robert M. Spiegel

It is hereby certified that error appears in the printed specification of the above numbered patent requiring correction and that the said Letters Patent should read as corrected below.

Column 6, lines 47 to 49, strike out "having an intermediate frequency stage, an automatic gain control circuit and an output circuit," and insert instead -- means for applying the output voltage representing said automatic gain control voltage to said electron discharge device, --.

Signed and sealed this 3rd day of May 1960.

(SEAL)
Attest:

KARL H. AXLINE
Attesting Officer

ROBERT C. WATSON
Commissioner of Patents